W. S. Cooper.
Globe-Valve.
Nº 76164.      Patented Mar. 31, 1868.
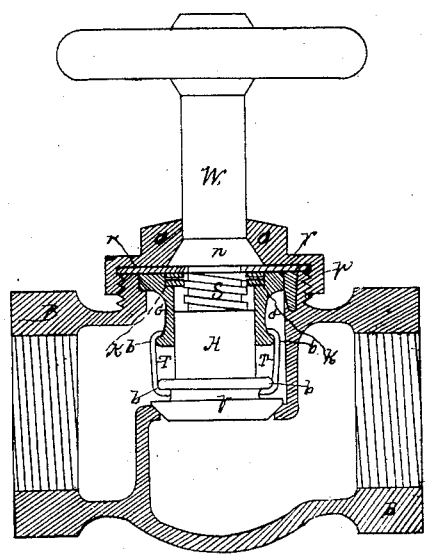
Witnesses;
George Veale Jr
Jno H Harder
Inventor:
Wm S Cooper

United States Patent Office.

WILLIAM S. COOPER, OF PHILADELPHIA, PENNSYLVANIA.

Letters Patent No. 76,164, dated March 31, 1868.

---

IMPROVEMENT IN GLOBE-VALVES.

---

The Schedule referred to in these Letters Patent and making part of the same.

---

TO ALL WHOM IT MAY CONCERN:

Be it known that I, WILLIAM S. COOPER, of the city and county of Philadelphia, and State of Pennsylvania, have invented a new and improved Method of Constructing Globe-Valves; and I do hereby declare that the following is a full, clear, and exact description of the same, reference being had to the accompanying drawing, and the letters of reference marked thereon.

The object of my invention is to protect the parts of valves that are subject to friction, from the abrading and corroding action of the fluids that are passed through them. For instance, in the manufacture of white lead, and similar compounds, formed by the aid of dilute acids, it is found that the parts of the valves, used for such purposes, on which there is any friction, are worn away much sooner than the parts that are subjected to a corroding action only, for the friction continually rubs off the corroded surfaces, making them bright and clean, in which state they are more subject to a corroding action than when already covered with a film of oxide. Again, such a valve as this is useful, when the substance passed is liable to gum and clog the screw. It will also prevent the gritty matter contained in impure water from reaching the screw and packing-valve. The most common case of the last difficulty is where the valve is used to blow off a steam-boiler, and is of so serious a character as to nearly exclude valves from use for this purpose, while the ground-key cocks, commonly employed, are always a source of trouble, leaking in a short time, and requiring very long levers to overcome the friction of the key when it is necessary to be turned on for use, sometimes sticking so tight as to break off the head of the key without turning. There are many other cases in which this improvement will be found very valuable, and which it is unnecessary here to recite.

I will now proceed to describe the construction and operation of my improvement.

The drawing represents an elevation of the valve, in which all but the valve proper and its screw are in section.

The body of the valve B may be of such a form as to suit the purpose to which it is to be applied. The cap or bonnet is shown at C. The spindle W is provided with a collar, $n$, the upper face of which fits the conical seat in the cap C, by which means a steam or water-tight joint is secured. The lower face of the collar $n$ is made flat, to be operated upon by a spring, K. The lower part of said spindle is provided with a screw, S. The valve V may be made of any suitable shape, but I provide it with a square shank, H, inside of which shank I cut a thread to receive the screw S of the spindle W. I make a central guide-piece, G, with a square socket and an annular flange to fit in the body, as represented. In the upper part of the central guide-piece G, I make an annular recess to receive the spring K. On the lower part of the central guide-piece G is formed a "bead" or collar, $b'$, and on the valve V, I construct a similar collar or bead, $b$, over which beads $b$ and $b'$ is stretched a rubber tube, T. The central guide-piece G, which is supported by a flange resting in the recess in the body B, made to receive it, as shown, is held firmly in position and prevented from rotating by means of a key or pin, $p$. A rubber washer, $r$, is placed on the under side of the collar $n$, and between the body B and the cap C, to prevent any leakage. When the parts of the valve are fitted together, ready for use, the angular shank H of the valve V will be inserted in the angular socket of the central guide-piece G, and the said central guide-piece is fitted in the neck of the body B, and is held firmly in position, and from rotating, by means of the pin $p$ and the cap or bonnet B. The spring K, when resting in the recess made to receive it, exerts its expansive force against the under side of the rubber washer $r$, and through it forces the collar $n$ to its seat in the cap C, and making there a perfectly tight joint, thus avoiding the necessity of any packing, which would require frequent renewals. When the spindle W is rotated, all vertical motion is prevented by its collar $n$ being held in place by the cap C and the spring K. The screw S accomplishes the withdrawing of the valve V from its seat in the body B. A contrary motion of the spindle W causes a return of the valve V to its seat to close the passage-way. All rotary motion of the valve V is prevented by its angular shank H, which slides readily in the angular socket of the central guide-piece G. The elasticity of the tube T is sufficient to cause no hindrance to the motion of the valve V.

When the valve has become worn and leaky, a regrinding is necessary, to accomplish which the cap C is unscrewed, and the central guide-piece G and spring K are removed from the stem, when the valve V is screwed firmly upon the spindle W, after which the valve is returned to its seat, and the cap C screwed down to its place as before. The abrading-material having been previously applied, a rotary motion is now given to the spindle and collar, during which operation the valve will be held in a correct position by means of the spindle W fitting neatly in the bonnet C. A tight joint is thus quickly effected without recourse being had to any of the crude appliances hitherto employed in such an operation. A similar operation effects a steam-tight joint between the collar n of the spindle W and its seat in the cap C. The rubber washer r prevents the access of abrading-material in the passing fluid to the collar n, and also gives greater security to the joint between the body B and cap C. The rubber tube T acts a similar part in preventing the access of the passing fluid to the screw S, and is of such an elastic nature as to allow the free motion of the valve V in the operation of opening and closing.

I do not claim the rubber packing p, the spring K, nor the conical-ground joint in the cap C, as this was the subject of Letters Patent, No. 59,122, dated October 23, 1866, granted to William S. Cooper, (myself;) nor do I claim the central guide-piece G, or the valve V, with its shank H, as these are the claims of a pending application; but

I claim as my invention, and desire to secure by Letters Patent—

1. The arrangement of the cap C, collar n of the spindle W, the washer r, spring K, central guide-piece G, and key P, with reference to the body B, substantially as specified and described.

2. The combination and arrangement of the central guide-piece G, valve V, and tube T, with the body B, substantially as described and specified.

WM. S. COOPER.

Witnesses:
GEORGE VEALE, Jr.,
JNO. H. WARDER.